Oct. 31, 1967 L. L. CAIN ET AL 3,349,854
ECCENTRIC VIBRATOR
Filed Oct. 13, 1964 2 Sheets-Sheet 2
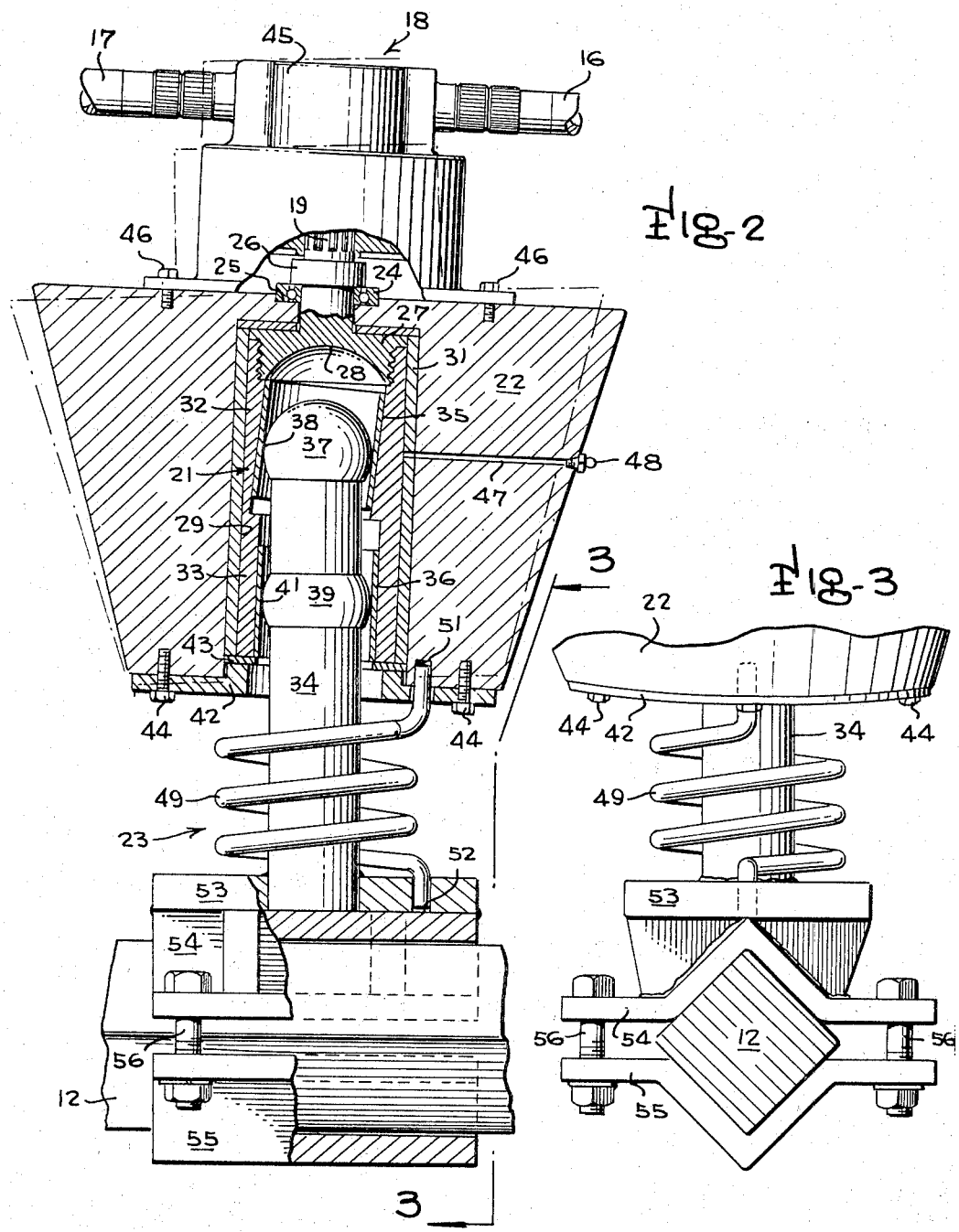
INVENTORS
LEONARD L. CAIN &
MERLE M. ROSE
ATTORNEYS

United States Patent Office 3,349,854
Patented Oct. 31, 1967

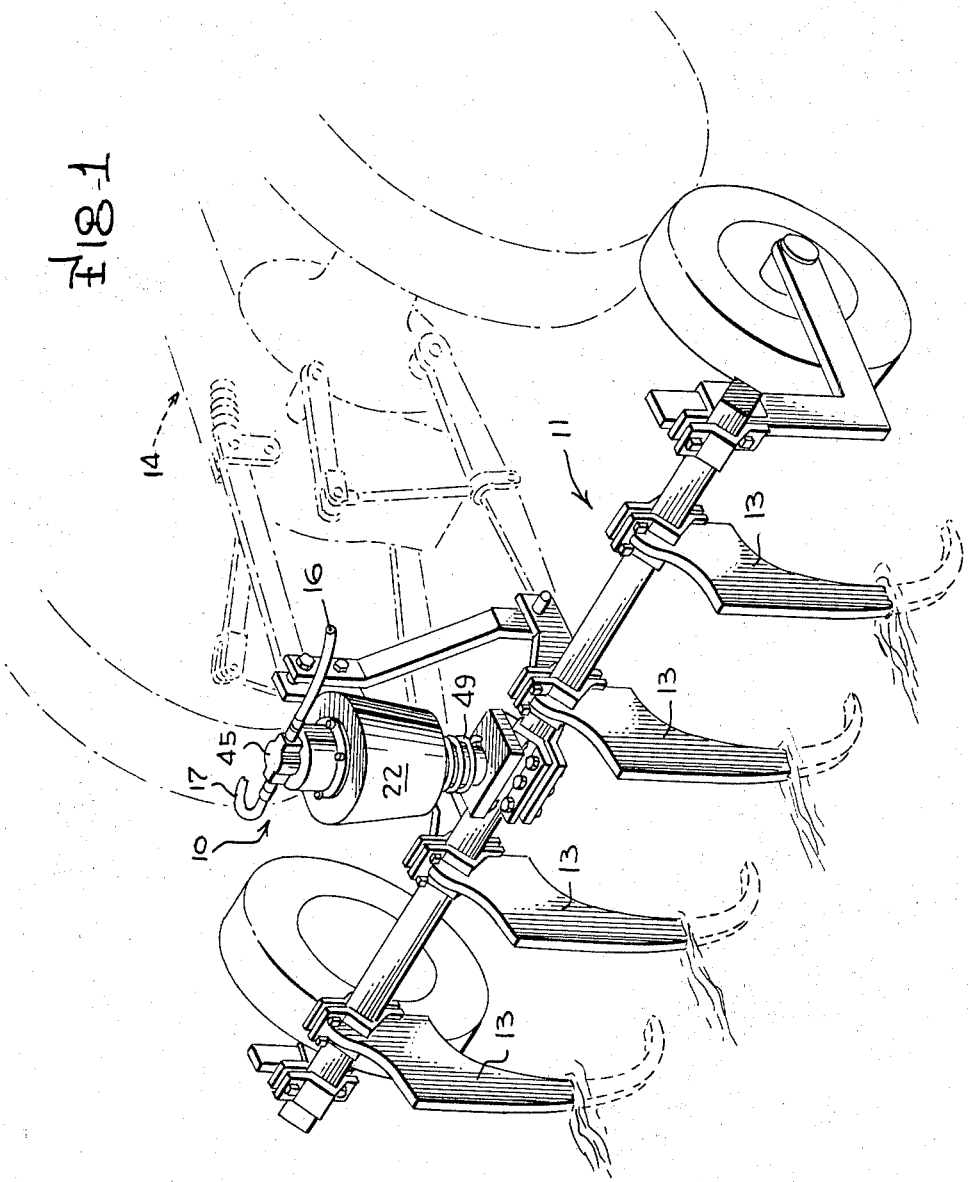

3,349,854
ECCENTRIC VIBRATOR
Leonard L. Cain and Merle M. Rose, Lubbock, Tex., assignors to Big Eight Implement Company, Lubbock, Tex., a corporation of Texas
Filed Oct. 13, 1964, Ser. No. 403,515
7 Claims. (Cl. 172—40)

ABSTRACT OF THE DISCLOSURE

A driven eccentric weight supported for rotation on a vertical shaft attached to an earth working tool and axially movable on the shaft to increase the eccentricity of the weight in proportion to its speed of rotation.

This invention pertains in general to vibrators and more particularly to means of utilizing a specific type of vibrator with soil and rock moving equipment.

It has been found that on many types of soil and rock moving equipment the efficiency of moving the earth is increased many fold by setting up vibrations of particular frequency within the equipment, thereby transmitting vibration to the soil engaging portions of the equipment. It has also been found that providing the soil moving equipment with various types of vibrators now on the open market there are certain deficiencies inherent in the operating range of these vibrators. There is a distinct advantage in using a vibrator having a variable frequency range which may be controlled by the operator to give optimum results in various types of soil and rocks.

Therefore, an object of this invention is the provision of means to transmit vibratory motion to soil engaging implements to permit easier and faster movement of soils and rocks.

Another object of this invention is the provision of a novel type of eccentric vibrator adapted to be attached to a plow or other soil engaging implement.

Another object of this invention is the provision of a vibrator which employs a variable eccentric to give a varying amount of vibratory motion to the soil working implement to which it is attached.

Another object of this invention is the provision of a vibrator which is inexpensive, easy to manufacture, and simple to use for the purposes above described.

Other objects, advantages and capabilities of the invention will become apparent from the following description, taken in conjunction with the accompanying drawings showing only a preferred embodiment of the invention.

In the drawings:

FIGURE 1 is a perspective view showing the vibrator of the present invention mounted upon a chisel type plow which is connected to a common type of farm tractor;

FIGURE 2 is a side elevational view of the vibrator of the present invention with portions in section and other portions broken away; and FIGURE 3 is a vertical section view of the vibrator mounting means taken along lines 3—3 of FIGURE 2.

A unique advantage of the vibrator system for moving soil and rock in the present invention is that the vibrator may be operated in any desired frequency range. The most effective frequency range may be determined by merely running the vibrator faster or slower according to the location, types of soil or general application to which the device will be put.

Referring now to the drawings wherein corresponding parts of the present invention are designated by common numerals throughout, and particularly to FIGURE 1, the vibrator assembly is designated generally by the numeral 10. The chisel type plow 11 is a type of plow that has at least one transversely extending tool bar 12 upon which is mounted a suitable number of chisel shanks 13 for engagement with the soil. The plow 11 is hitched to the tractor 14 from which the vibrator assembly takes its operative power. In the case shown herein the power is hydraulic and is supplied through the flexible hydraulic fluid lines 16, 17.

Generally the vibrator 10 comprises a hydraulic motor drive assembly 18, a drive shaft 19 depending therefrom, a variable eccentric drive cylinder 21 integral with the drive shaft, a vibratory mass or weight 22 and a supporting assembly 23 to operatively support the entire vibrator assembly. The hydraulic motor drive assembly may be of any suitable drive and it is contemplated that any well known drive would operate the present invention. However, in the present invention it has been found that the hydraulic motor accomplishes the purposes of the invention in the best possible manner and it generally includes a suitable hydraulic fluid flowing through the flexible lines 16, 17 to drive an impeller (not shown) which in turn imparts rotation to the drive shaft 19.

The drive shaft 19 is suitably journaled in roller bearings 24 which are positioned within a suitable cavity 25 in the top planar surfaces of the vibratory weight 22. To limit the movement of drive shaft 19 in a vertical direction and to support it within the roller bearings 24, a limiting collar 26 is provided about the periphery of the drive shaft and is adapted to rest upon the roller bearings. Integrally connected with the drive shaft 19 is a threaded cap 27 which is adapted to be screwed into the topmost portion of the variable eccentric drive cylinder 21. The bottom of the threaded cap 27 is hollowed out into a spherical configuration noted by numeral 28 to provide a suitable bearing surface for other portions of the structure that will be later described.

The variable eccentric drive cylinder 21 has a perfect cylindrical outer peripheral surface 29 adapted to revolve within outer sleeve bearings 31. The sleeve bearings 31 are completely encased within the vibratory mass 22 which are not meant to have relative rotation therewith. The drive cylinder 21 comprises essentially an upper off-center drilled cylinder half 32 and a lower on-center drilled cylinder half 33. The upper half 32 would be manufactured before the threaded cap 27 would be inserted therein and such a manufacturing procedure would be to drill the interior of the upper cylinder half 32 starting from the top thereof and drilling from a point that is on center with respect to the axis of the cylinder 21 and angling the drill in such a manner that it drills the upper cylinder 32 at an incline to the axis of cylinder 21 so that the lowermost portion of upper cylinder half 32 will be drilled off center. The degree of eccentricity drilled into the upper cylinder half 32 is not particularly important nor is the length of this half important to the operation of this present invention. The degree of eccentricity may vary and the length of upper cylinder half 32 will be the same as lower cylinder half 53. This is necessary because mass 22 can travel up and equal to the length of cylinder halves, limited of course by spring 49.

The lower cylinder half 33 would then be drilled from the bottom of the drive cylinder 21 so that the entire length of the lower cylinder half 33 is drilled on center to the longitudinal axis of drive cylinder 21. The drilling operation would obviously cease when the upper and lower cylinder halves intersect and give the desired throughbore that would permit the support shaft 34 to be inserted therein. Within the upper cylinder half 32 and lower cylinder half 33 are innersleeve bearings 35, 36 respectively. These sleeve bearings would be adapted to rotate with the drive cylinder 21 and affixed thereto.

The support shaft 34 projects its upper end into the upper cylinder half 32 and is capped by spherical bearing surface 37. This bearing surface engages the innersleeve bearing 35 at one peripheral pivot point 38. In FIGURE 2 pivot point 38 is shown having at the rest position of the vibrator assembly, and it should be noted that the peripheral pivot point would vary about the periphery of top bearing surface 37 with the device in operation. Spaced axially from the top spherical bearing surface 37 is a lower spherical bearing surface 39 integrally mounted about support shaft 34. The lower bearing surface 39 is positioned upon bearing shaft 34 in such a manner that it engages the bottom innersleeve bearing 36 at peripheral pivot point 41 in the same manner as was described for pivot point 38. However, since the lower cylinder half 33 is drilled on-center the degree of eccentricity in this area will be considerably less than in the upper cylinder half 32, and the spherical bearing surface 39 need not be an entire sphere.

For the vibrator 10 to properly operate the vibratory mass 22, carrying with it the drive cylinder 21 and drive shaft 19, it must be perfectly free to raise and lower with respect to support shaft 34 and must be free to rock to and fro the same distance as the eccentric of the upper cylinder half 32 is off center. It is obvious that the separation between pivot points 38 and 41 act as a fulcrum and actually will multiply the vibration imparted to the entire vibrator 10 by a multiple dependent upon the distance separating the pivot points.

To maintain the sleeve bearing 31 and the drive cylinder 21 within the vibratory mass 22 is a cover plate 42 which engages the bottom most surfaces of the drive cylinder and sleeve bearing. To prevent undue wear between the cover plate 42 and the bottom surfaces of drive cylinder 21 and sleeve bearing 31, a bottom bearing surface 43 is inserted there between. Maintaining the cover in operative position are a plurality of cover plate holding screws 44.

Covering the hydraulic motor is a motor drive housing 45 which is attached to the top of the vibratory weight 22 by means of suitable fasteners 46. Located transversely through weight 22 and through the outer sleeve bearing 31 is a grease conduit 47 for supplying lubricating grease to the bearing surfaces between sleeve bearing 31 and drive cylinder 21. A grease fitting 48 provides a convenient cap and access cover for the conduit 47.

To maintain the motor drive assembly 18 and vibratory weight 22 upon the support shaft 34, and to maintain the pivot points 38 and 41 generally centered within their respective cylinder halves when the device is at rest, there is provided a coiled support spring 49. This spring has one end which engages a cavity 51 located within the bottom of weight 22, and the other end of the spring engages at suitable cavity 52 within the support plate 53. The spring 49 need not be of any particular weight or strength other than that which will stand up under extreme vibratory pressure. The spring has a two fold purpose in that it supports the weight of the motor drive assembly 18 and the vibratory mass 22 with its associated internal structure and also lends flexibility for vertical movement of the assembly when it vibrates. The remaining portion of the support assembly 23 comprises an upper tool bar clamp 54 and a lower tool bar clamp 55 interconnected by suitable fasteners 56 to securely fasten the entire assembly to the tool bar 12.

In operation of the present invention it is assumed that the vibrator assembly 10 would be connected to a soil engaging implement 11 such as shown in FIGURE 1. When it is desired to work the earth the tractor operator would preferably supply hydraulic fluid to the motor 18 which would turn a suitable impeller for driving the drive shaft 19 in the desired rotary manner. As the drive shaft revolves it necessarily carries with it the variable eccentric drive cylinder 21, which is freely revolving within the mass 22 and the outer sleeve bearing 31. Mass 22 is prevented from rotation by the restraining force of the support spring 49 which prevents the mass from following the rotation of the variable eccentric drive cylinder. As the drive cylinder 21 rotates, the upper off-centered drilled cylinder half 32 revolves about the longitudinal axis of the support shaft 34 in an eccentric manner. As can be seen from FIGURE 2 the top most portion of the cylinder half 32 revolves without any eccentricity. However, because of the off-centered drilling, the lower most portion of cylinder half 32 is considerably off-centered and will revolve with considerable eccentricity. Since the support shaft and spherical bearing surface 37 is initially positioned in a vertical manner generally midway in the upper cylinder half 32, the revolving drive cylinder 21 goes into an orbit about the longitudinal axis of the support shaft that is highly eccentric.

Obviously the eccentric motion is imparted to the vibratory mass 22 which is set into an eccentric vibratory motion thereby transmitting this motion back to the shaft 34 and eventually to the soil engaging implement. However, when the speed of the hydraulic fluid increases thereby revolving the drive shaft at a faster speed, the mass 22 will tend to rise from its previous position on shaft 36 in such a manner that if it were not restrained by spring 49 it would move vertically on the shaft 34 and leave it entirely. However, the spring 49 is so designed as to keep the mass 22 within safe limits upon the shaft 34. As the speed increases and the mass 22 rises vertically on the shaft, it is obvious from FIGURE 2 that the spherical bearing surface 37 and its pivot point 38 will bear against the upper cylinder half 32 in which the eccentricity is the greatest. Thus by increasing the speed of the drive shaft 19 the eccentricity of the vibratory mass will increase, which in turn will impart a vibratory motion to the soil engaging implement. Therefore, by merely decreasing the speed of the vibratory drive means a lower vibrating frequency is obtained to render the soil engaging implement less efficient. As the speed of the vibrator is slowed the vibratory mass 22 tends to lower itself about shaft 34 to a normal rest position with the consequent result of the frequency of vibration lessening. In actual practice the distance between pivot points 38 and 41 determines the severity with which the vibratory mass 22 vibrates with the pivot point 41 acting in effect as a fulcrum whose effect is multiplied by the distance between the pivot points.

Once the entire vibration assembly is vibrating at a desired frequency, which is controlled solely by the velocity of the hydraulic fluid being supplied by flexible lines 16, 17 from tractor 14 to the motor drive assembly 18, the vibrations will be transmitted to the soil and rock engaging implement 11 in the desired manner. Such a vibratory motion obviously will aid in the movement of earth that is being operated upon.

From the foregoing, applicant has shown not only how the desired vibratory motion may aid in the movement of earth but has also shown a particularly novel device for effecting such a movement. Such a device having the desired features as mentioned in the objects of this invention will at once become well accepted within the art and have outstanding commercial success.

While I have particularly shown and described one particular embodiment of the invention, it is distinctly understood that the invention is not limited thereto but that modifications may be made within the scope of the invention and such variations as are covered by the scope of the appended claims. For example, the invention is also particularly effective for use in equipment for drilling holes, driving piling and many other earth working or moving devices.

What is claimed is:

1. A vibrator assembly for use with soil moving implements to improve efficiency with which soil is moved comprising a drive shaft being connected at one end to a power means, a variable eccentric drive means, the other end of the drive shaft adapted for connection to the variable eccentric drive, a vibratory mass journaled in surrounding relationship about the eccentric drive so that relative motion may take place therebeween, fulcrum means mounted in conjunction with the variable eccentric and a supporting assembly in intimate contact with the fulcrum means and the soil engaging implement to transmit motion from the vibratory mass to the soil engaging implement when the drive shaft revolves the eccentric thereby producing vibratory motion in the mass.

2. A vibrator assembly comprising a drive shaft being connected at one end to a power means, a vibratory mass, a variable eccentric drive means, the other end of the drive shaft adapted for connection to the variable eccentric drive, the vibratory mass journaled in surrounding relationship about the variable eccentric drive so that relative motion may take place therebetween, fulcrum means mounted in conjunction with the variable eccentric drive so that said variable eccentric device proportionally changes its eccentricity in response to changes in the speed of rotation of said drive shaft so that the proportion of said vibratory mass which is eccentric is increased to provide more forceful vibrations of said mass as the speed of rotation of said drive shaft increases and a supporting assembly in intimate contact with the fulcrum means to accept vibrations from the vibratory mass when the drive shaft revolves the variable eccentric about the fulcrum means.

3. A vibrator assembly comprising a drive shaft being connected at one end to a power means, a vibratory mass, a unitary variable eccentric drive means, the variable eccentric drive being of cylindrical configuration with open first and second ends, the other end of the drive shaft being coupled with the first end for rotating said unitary variable eccentric drive means, the vibratory mass journaled in surrounding relationship about the variable eccentric drive so that relative motion may take place therebetween, fulcrum means mounted in conjunction with the variable eccentric drive and a supporting assembly in intimate contact with the fulcrum means to accept vibrations from the vibratory mass when the drive shaft revolves the variable eccentric about the fulcrum means.

4. A vibrator assembly comprising a drive shaft being connected at one end to a power means, a vibratory mass, a variable eccentric drive means, the variable eccentric drive being a cylinder with open first and second ends, the other end of the drive shaft being coupled with the first end for rotatably driving said cylinder, a first portion of the length of the eccentric drive cylinder being drilled angularly to the longitudinal axis of the eccentric drive cylinder, a second portion of the length of the eccentric drive cylinder being drilled on the longitudinal axis of the eccentric drive cylinder and to such a distance as to interconnect with the first portion, the vibratory mass journaled in surrounding relationship about the variable eccentric drive so that relative motion may take place therebetween, fulcrum means mounted in conjunction with the variable eccentric drive and a supporting assembly in intimate contact with the fulcrum means to accept vibrations from the vibratory mass when the drive shaft revolves the variable eccentric about the fulcrum means.

5. A vibrator assembly comprising a drive shaft being connected at one end to a power means, a vibratory mass, a variable eccentric drive cylinder means, the other end of the drive shaft adapted for connection to the variable eccentric drive cylinder, the vibratory mass journaled in surrounding relationship about the variable eccentric drive cylinder so that relative motion may take place therebetween, fulcrum means mounted in conjunction with the variable eccentric drive cylinder, a supporting shaft assembly in intimate contact with the fulcrum means, the supporting assembly including a base supporting plate, and resilient means interconnecting the base supporting plate with the mass so as to operatively position the mass and drive cylinder upon the supporting shaft to accept vibrations from the vibratory mass when the drive shaft revolves the variable eccentric about the fulcrum means.

6. A vibrator assembly comprising a drive shaft being connected at one end to a power means, the power means being a hydraulic motor coupled to the drive shaft, a vibratory mass, a variable eccentric drive means, the variable eccentric drive being of cylindrical configuration with open first and second ends, the other end of the drive shaft being coupled with the first end, a first portion of the length of the eccentric drive cylinder being drilled angularly to the longitudinal axis of the eccentric drive cylinder, a second portion of the length of the eccentric drive cylinder being drilled on the longitudinal axis of the eccentric drive cylinder and to such a distance as to interconnect with the first portion, the vibratory mass journaled in surrounding relationship about the variable eccentric drive so that relative motion may take place therebetween, fulcrum means mounted in conjunction with the variable eccentric drive including a supporting shaft and a supporting assembly, the supporting shaft having its lower end in contact with the supporting assembly and the upper end terminating in a spherical bearing surface, a rounded bearing surface on the shaft spaced down the shaft from the spherical bearing surface, the top spherical bearing surface adapted to bear within the angularly drilled first portion of the drive cylinder and the lower rounded bearing surface adapted to bear within the second drilled portion of the drive cylinder, the supporting assembly in intimate contact with the fulcrum means, the supporting assembly including a base supporting plate, and resilient means interconnecting the base supporting plate with the mass so as to operatively position the mass and drive cylinder upon the supporting shaft to accept vibrations from the vibratory mass when the drive shaft revolves the variable eccentric about the fulcrum means.

7. In a soil working implement means mounted upon supporting means for movement in working engagement with the soil, the improvement comprising:
vibrator means attached to said soil working implement means and including a vibratory mass mounted for eccentric bodily rotation about an axis of rotation;
variable speed power means; and
variable eccentric drive means connected between said power means and said vibratory mass and including means for automatically varying the degree of eccentricity of said vibratory mass with respect to said axis of rotation in response to speed variations of said power means to enable achievement of optimum vibratory action for any given soil condition.

References Cited

UNITED STATES PATENTS 1,392,345   10/1921   Lowe.
2,457,417   12/1948   Trautmann _____ 74—86 X
3,211,236   10/1965   Patton _____ 172—40

ABRAHAM G. STONE, *Primary Examiner.*

WILLIAM A. SMITH III, *Examiner.*

J. R. OAKS, *Assistant Examiner.*